US011392386B2

(12) United States Patent
Orzol et al.

(10) Patent No.: US 11,392,386 B2
(45) Date of Patent: Jul. 19, 2022

(54) PROGRAM COUNTER (PC)-RELATIVE LOAD AND STORE ADDRESSING FOR FUSED INSTRUCTIONS

(71) Applicant: International Business Machines Corporation, Armonk, NY (US)

(72) Inventors: Nicholas R. Orzol, Austin, TX (US); Christian Gerhard Zoellin, Austin, TX (US); Brian W. Thompto, Austin, TX (US); Dung Q. Nguyen, Austin, TX (US); Niels Fricke, Herrenberg (DE); Sheldon Bernard Levenstein, Austin, TX (US); Phillip G. Williams, Cape Coral, FL (US); Brian D. Barrick, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/993,452

(22) Filed: Aug. 14, 2020

(65) Prior Publication Data
US 2022/0050684 A1 Feb. 17, 2022

(51) Int. Cl.
*G06F 9/38* (2018.01)
*G06F 9/30* (2018.01)
*G06F 9/355* (2018.01)

(52) U.S. Cl.
CPC ........ *G06F 9/3853* (2013.01); *G06F 9/30185* (2013.01); *G06F 9/3557* (2013.01); *G06F 9/3836* (2013.01); *G06F 9/30043* (2013.01)

(58) Field of Classification Search
CPC .. G06F 9/3557; G06F 9/3853; G06F 9/30043; G06F 9/3836; G06F 9/30185
See application file for complete search history.

(56) References Cited

U.S. PATENT DOCUMENTS 5,333,288 A * 7/1994 Kusuda ............... G06F 9/355
711/214
6,473,832 B1 * 10/2002 Ramagopal ......... G06F 9/3824
711/118

(Continued)

FOREIGN PATENT DOCUMENTS

WO 01/50256 A1 7/2007

OTHER PUBLICATIONS

Nagarajan, V., et al., "Architectural Support for Shadow Memory in Multiprocessors", VEE'09, Mar. 11-13, 2009, 10 pages.

*Primary Examiner* — Courtney P Carmichael-Moody
(74) *Attorney, Agent, or Firm* — Scully, Scott, Murphy & Presser, P.C.

(57) ABSTRACT

Load store addressing can include a processor, which fuses two consecutive instruction determined to be prefix instructions and treats the two instructions as a single fused instruction. The prefix instruction of the fused instruction is auto-finished at dispatch time in an issue unit of the processor. A suffix instruction of the fused instruction and its fields and the prefix instruction's fields are issued from an issue queue of the issue unit, wherein an opcode of the suffix instruction is issued to a load store unit of the processor, and fields of the fused instruction are issued to the execution unit of the processor. The execution unit forms operands of the suffix instruction, at least one operand formed based on a current instruction address of the single fused instruction. The load store unit executes the suffix instruction using the operands formed by the execution unit.

20 Claims, 9 Drawing Sheets

(56) References Cited

U.S. PATENT DOCUMENTS

| | | |
|---|---|---|
| 9,971,713 B2 | 5/2018 | Asaad et al. |
| 10,417,141 B2 | 9/2019 | Pellegrini et al. |
| 10,664,171 B2 | 5/2020 | Chen et al. |
| 2013/0086363 A1* | 4/2013 | Gschwind ............ G06F 9/30185 |
| | | 712/220 |
| 2017/0083316 A1 | 3/2017 | Burger et al. |
| 2017/0115991 A1 | 4/2017 | Abdallah |
| 2018/0081691 A1 | 3/2018 | Kulkarni et al. |
| 2019/0042239 A1* | 2/2019 | Genden ................ G06F 9/3855 |
| 2019/0235866 A1 | 8/2019 | Das Sarma et al. |

* cited by examiner

PROGRAM COUNTER (PC)-RELATIVE LOAD AND STORE ADDRESSING FOR FUSED INSTRUCTIONS

BACKGROUND

The present application relates generally to computer architecture, information handling and data processing systems, processors, and more particularly to program counter (PC)-relative load and store addressing.

In modern information and data handling systems, processors can be "pipelined" to handle executing instructions, in some instances, out-of-order, and have multiple elements that operate in parallel to process multiple instructions in a single processing cycle. Pipelining involves processing instructions in stages, so that the pipelined stages may process a number of instructions concurrently. Executing instructions out-of-order creates additional complexity in handling and processing instructions. Depending upon how the instructions are handled in out-of-order processors, processor latency and inefficiency may result.

The processor can include a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues to hold data, information and/or instructions for the execution units.

In modern computer architecture, there can be multiple execution units within an execution slice including load-store units (LSUs), vector-scalar units (VSUs), arithmetic logic units (ALUs), among other execution units. A LSU typically contains one or more store queues each having entries to track store instructions and hold store data, and one or more load queues each having entries to track load instructions and hold load data. Executing instructions such as instructions which are related or depend from a previous instruction can take multiple cycles to execute and complete.

BRIEF SUMMARY

The summary of the disclosure is given to aid understanding of a computer system, computer architectural structure, processor, processor pipelines, register files, execution units, and method of addressing and handling instructions in a processor, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In one or more embodiments, a computer system and method for processing information is disclosed. A method, in an aspect, can include detecting that two consecutive instructions fetched using a program counter, include a prefix instruction and a suffix instruction. The method can also include fusing the prefix instruction and the suffix instruction as a single fused instruction. The method can further include sending a current instruction address of the single fused instruction to an execution unit of the processor. The method can further include sending the suffix instruction and the prefix instruction to an issue unit of the processor to write into an issue queue as a full entry in the issue queue to be issued together. The method can also include issuing from the full entry of the issue queue the suffix instruction and a field of the prefix instruction, wherein an opcode of the suffix instruction is issued to a load store unit of the processor, and a field of the suffix instruction and the field of the prefix instruction are issued to the execution unit of the processor. The method can also include forming, by the execution unit, operands of the suffix instruction, at least one operand of the operands formed based on the current instruction address. The method can further include sending, by the execution unit, the operands to the load store unit. The method can also include executing, by the load store unit, the suffix instruction using the operands formed by the execution unit.

A system, in one aspect, can include a processor with circuit and logic configured to process instructions. The processor can include an instruction fetch unit configured to fetch instructions based on reading a program counter. The processor can also include an issue unit having a dispatch unit and an issue queue, the issue queue configured to hold a plurality of instruction entries and further configured to issue instructions according to the instruction entries for execution. The processor can further include an execution unit. The processor can also include a load store unit configured to execute load and store instructions. The processor can be configured to detect that two consecutive instructions fetched using a program counter, include a prefix instruction and a suffix instruction, and fuse the two consecutive instructions as a single fused instruction. The processor can be further configured to send a current instruction address of the single fused instruction to the execution unit. The processor can be further configured to send the suffix instruction and the prefix instruction to the issue unit of the processor to write into the issue queue as a full entry in the issue queue to be issued together. The issue queue can be configured to issue from the full entry of the issue queue the suffix instruction and a field of the prefix instruction, wherein an opcode of the suffix instruction is issued to the load store unit, and a field of the suffix instruction and the field of the prefix instruction are issued to the execution unit. The execution unit can be configured to form operands of the suffix instruction, at least one operand of the operands formed based on the current instruction address held by the execution unit, the execution unit further configured to send the operands to the load store unit. The load store unit can be configured to execute the suffix instruction using the operands formed by the execution unit.

In another aspect, a processor can be provided. The processor, in one aspect, can include an instruction fetch unit having circuit and logic. The instruction fetch unit can be configured to detect that two consecutive instructions fetched using a program counter, include a prefix instruction and a suffix instruction. The instruction fetch unit can be further configured to fuse the two consecutive instructions as a single fused instruction. The processor can also include an issue unit having circuit and logic. The issue unit can be configured to receive the single fused instruction having the suffix instruction and the prefix instruction and to write the single fused instruction into an issue queue as a full entry in the issue queue. The issue unit can further have a dispatch unit configured to auto-finish the prefix instruction of the single fused instruction. The issue queue can be configured to issue from the full entry of the issue queue the suffix instruction and a field of the prefix instruction. The processor can also include a vector scalar unit having circuit and logic. The vector scalar unit can be configured to form operands of the suffix instruction, at least one operand of the operands formed based on the current instruction address held by the execution unit. The processor can also include a load store unit having circuit and logic. The load store unit can be configured to execute the suffix instruction issued by the issue queue using the operands formed by the vector scalar unit.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

Embodiments are provided in the figures for the purpose of illustrating aspects, features, and/or various embodiments of the computer system, computer architectural structure, processors, processor pipelines, register files, and their method of operation, but the claims should not be limited to the precise system, embodiments, methods, processes and/or devices shown, and the features, and/or processes shown may be used singularly or in combination with other features, and/or processes.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, accumulator register files, and their method of operation, however, it will be understood by those skilled in the art that different and numerous embodiments of the computer system, computer architectural structure, processor, register files, accumulator register files, and their method of operation can be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

The following discussion omits or only briefly describes conventional features of information processing systems, including processors and microprocessor systems and architecture, which are apparent to those skilled in the art. It is assumed that those skilled in the art are familiar with the general architecture of processors, and, in particular, with processors which operate in an out-of-order execution fashion, including multi-slice processors and their use of registers. It may be noted that a numbered element is numbered according to the figure in which the element is introduced, and is often, but not always, referred to by that number in succeeding figures.

Figure 1:
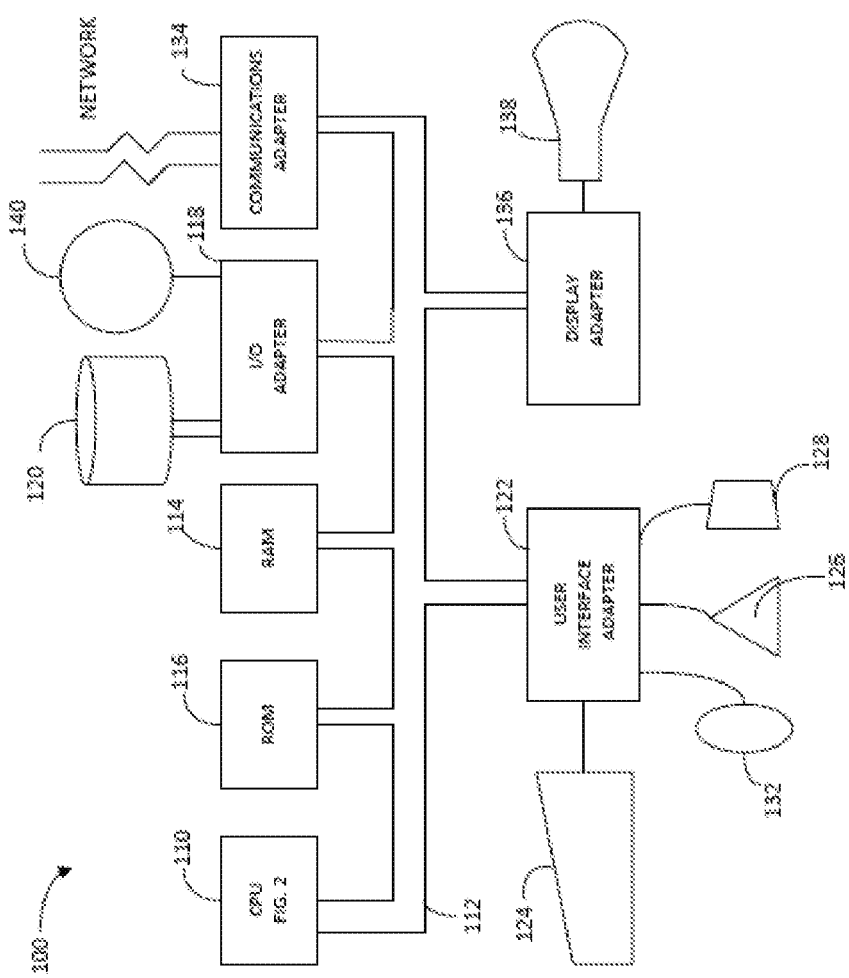
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) or processor 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

Figure 2:
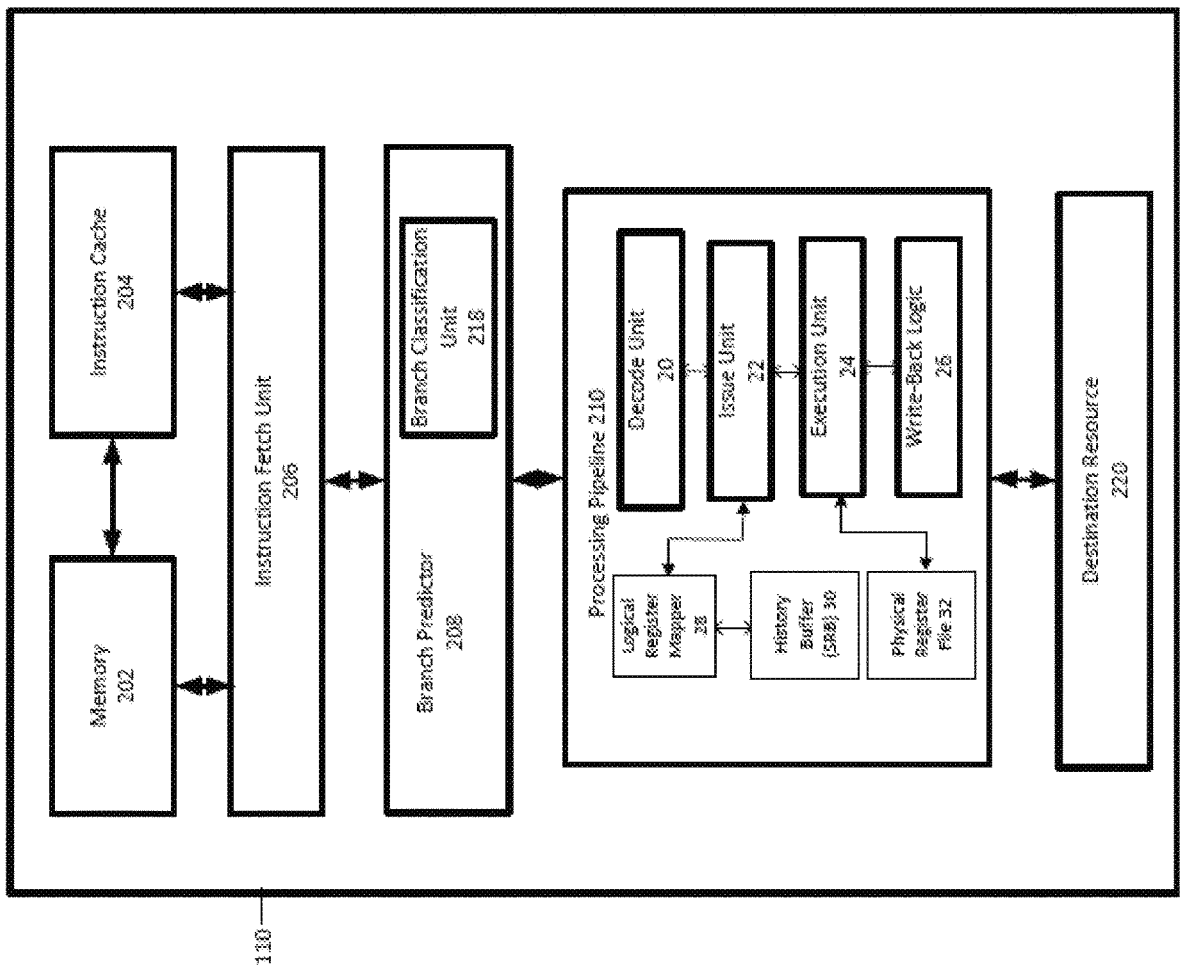
FIG. 2 illustrates a block diagram of an embodiment of a processor in which certain aspects of the present disclosure may be practiced.

FIG. 2 depicts a simplified block diagram of a processor 110 according to an embodiment. The CPU (or "processor") 110 includes units formed by integrated circuitry, and may operate according to reduced instruction set computing ("RISC") techniques. The CPU 110 processes according to processor cycles, synchronized, in some aspects, to an internal clock (not shown). In the example of FIG. 2, the processor 110 includes memory 202, instruction cache 204, instruction fetch unit (IFU) 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit (IFU) 206 and the processing pipeline 210 are depicted. In various embodiments, the processor 110 may include multiple processing pipelines 210 and instruction fetch units (IFUs) 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit (IFU) 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit (IFU) 206 fetches instructions from the instruction cache 204 for further processing by the decode unit 20. The decode unit 20 decodes instructions and passes the decoded instructions or portions of instructions to the issue unit 22. The decode unit 20 may also detect branch instructions which were not predicted by branch predictor 208. The issue unit 22 analyzes the instructions or other data and transmits the decoded instructions or portions of instructions to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units (LSUs), vector scalar execution units (VSUs), and/or other execution units. The logical register mapper 28 contains entries which provide a mapping between a logical register entry (LReg) and an entry in the physical register file 32. When an instruction specifies to read or to store information to a logical register entry (LReg), the logical register mapper 28 informs the issue unit 22, which informs the execution unit 24 where the data in the physical register file 32 can be located or stored.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data from the logical register mapper 28 in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
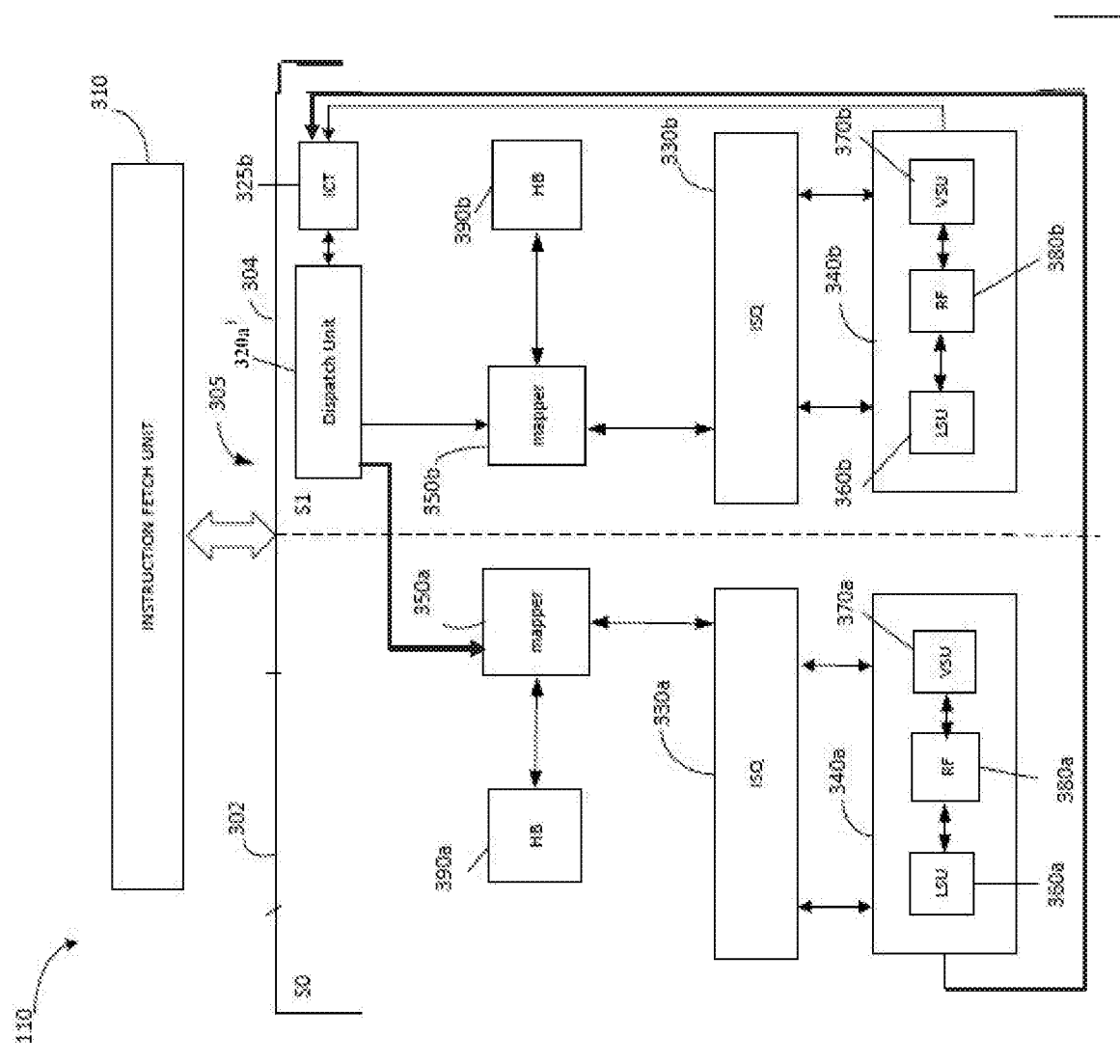
FIG. 3 illustrates a block diagram of an embodiment of a portion of a multi-slice processor.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices-Slice 0 (slice S0 or 302) and Slice 1 (slice S1 or 304). The processor includes an Instruction Fetch unit 310 and Instruction Dispatch Unit 320*a*. The processor can also include an Instruction Completion Table (ICT) (325*b*). Each of the slices S0 and S1 can include a Logical Register Mapper (350*a* and 350*b*); a History Buffer (HB) (390*a* and 390*b*); an Issue Queue (ISQ) (330*a* and 330*b*); and Execution Units (340*a* and 340*b*). The execution units(s) could include, for example, a load store unit (LSU) (360*a* and 360*b*), a vector scalar unit (VSU) (370*a* and 370*b*), and a Register File (RF) (380*a* and 380*b*).

The Execution Unit 340 may include one or more queues to hold instructions for execution by the Execution Unit 340. For example, the LSU 360 can include a load queue and/or a store queue, and can also include a data cache, for example, a L1 data cache. It may be noted that the two slices are shown for ease of illustration and discussion only, and that multi-slice processor 110 may include more than two processing or execution slices with each slice having more or less than the components discussed above for each of the slices S0 and S1 (slices 302 and 304). Further, the processing slices may be grouped into super slices (SS 305), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit (IFU) 310 fetches instructions to be executed by the processor 110 or processor slice. Referring to S0, by way of example (similar operations apply to the components of S1), instructions that are fetched by the Instruction Fetch Unit 310 are sent to the Instruction Dispatch Unit 320*a*. The Instruction Dispatch Unit 320*a* dispatches instructions to the Issue Queue (ISQ) 330*a*, typically in program order. The Issue Queue (ISQ) 330*a* will issue instructions to the Execution Unit 340*a*. The Instruction Dispatch Unit 320*a* and Issue Queue 330*a* and 330*b* can together also be referred to as an Instruction Issue Unit (ISU). The ISQ 330*a* typically holds an instruction until data associated with the instruction has been retrieved and ready for use. A physical register file 380*a* may serve to store data to be used in an operation specified in an instruction dispatched to an execution unit 340*a*, and the result of the operation performed by the Execution Units 340*a* may be written to the designated target register entry in the physical register file 380*a*.

In certain aspects, the ISQ 330a holds a set of instructions and the register file 380a accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the execution units, e.g., LSUs 360a and VSUs 370a, may make result data available on the write back buses for writing to a register file (RF) entry.

When data is not ready, e.g., not within the appropriate data cache or register, delay can result as the ISQ 330a will not issue the instruction to the Execution Unit 340a. For at least this reason, the Issue Queue (ISQ) typically issues instructions to the Execution Units 340a out of order so instructions where the required data is available can be executed. Dispatch Unit 320a in one or more embodiments will stamp each instruction dispatched to the Issue Queue 330a with an identifier, e.g., identification tag (iTag), to identify the instruction. The Dispatch Unit 320a may stamp instructions with other information and meta data. The instructions (iTags) typically are allocated (assigned) and stamped in ascending program order on a per thread basis by the Dispatch Unit 320a.

Logical register mapper 350a contains meta data (e.g., iTag, RFtag, etc.) which provides a mapping between entries in the logical register (e.g., GPR1) and entries in physical register file 380a (e.g., physical register array entry). The RFtag is the pointer that correlates a logical register entry to a physical register file entry. For example, when an instruction wants to read a logical register, e.g., GPR1, the logical register mapper 350a tells issue queue 330a, which tells execution unit 340a where in the physical register file 380a it can find the data, e.g., the physical register array entry. The Execution Unit 340a executes instructions out-of-order and when the Execution Unit 340a finishes an instruction, the Execution Unit 340a will send the finished instruction, e.g., iTag, to the ICT 325b. The ICT 325b contains a queue of the instructions (iTags) dispatched by the Dispatch Unit 320a and tracks the progress of the instructions (iTags) as they are processed.

History buffer (SRB) 390a contains logical register entries that are evicted from the logical register mapper 350a by younger instructions. The information stored in the history buffer (SRB) 390a may include the iTag of the instruction that evicted the logical register entry (i.e., the evictor iTag) from the logical register. History buffer (SRB) 390a, in an embodiment, stores iTag, logical register entry number (the bit field that identifies the logical register entry (LReg)), and Register File tag (RFTag) information. History buffer (SRB) 390a may store and track other information. History buffer (SRB) 390a has an interface to the logical register mapper 350a to recover the iTag, and register file tag (RFTag) (and other meta data) for each evicted logical register entry (LReg). The information is kept in the history buffer (SRB) 390a in a history buffer (SRB) entry until the new instruction (evictor instruction) is completed, at which point, in an embodiment, the entry is removed from the history buffer (SRB) 390a.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two or more threads (SMT2), (SMT4) are simultaneously processed.

To improve processor efficiency and performance, in one or more embodiments, two consecutive instructions can be executed simultaneously. For example, a pair of prefix instructions (e.g., prefix instruction and corresponding suffix instruction) or an instruction having a prefix part and suffix part, also referred to as prefixed instruction, can be fused and executed together, for example, in 1 cycle.

In embodiments, systems, methods and techniques are provided that enhance program counter (PC)-relative load and store addressing, for example, in processor execution instructions. Load and store addressing determines address locations for load and store operations. PC-relative addressing is an addressing scheme for data where the location of the data is identified with an offset or distance from the current instruction address in the program counter (PC).

In embodiments, systems, methods and techniques enable processing of program counter-relative storage instructions as a single internal operation, wherein a shadow effective address table in an arithmetic execution unit such as the VSU provides a lookup mechanism for retrieving a current instruction address (CIA) to send to the load and store unit (LSU) for storage access. Such a method can avoid a need to split the instruction into multiple serialized operations and, for example, enhance PC-relative load and store addressing.

Figure 4:
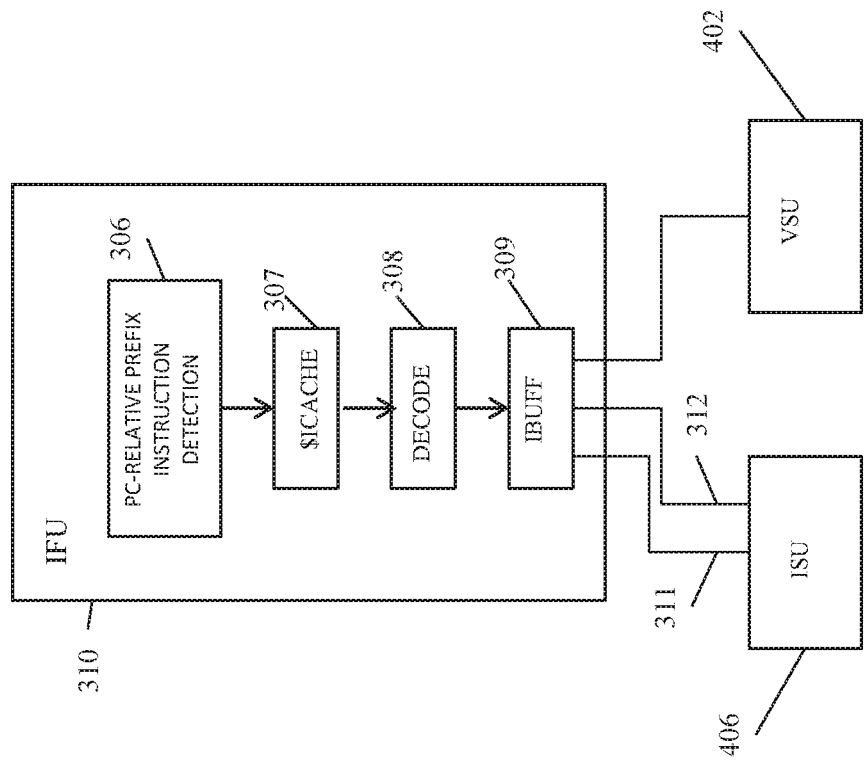
FIG. 4 illustrates a block diagram of an embodiment of an instruction fetch unit.
Figure 5:
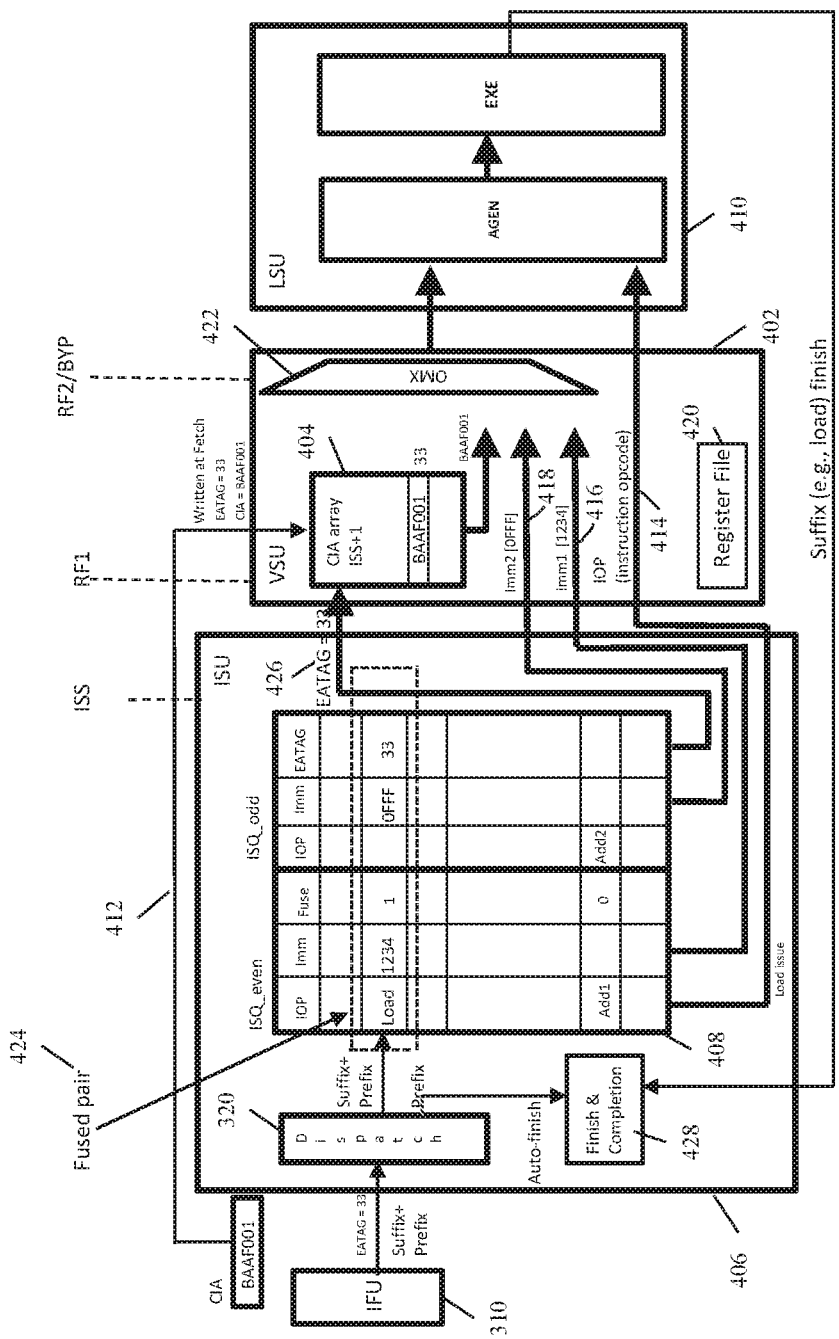
FIG. 5 illustrates a current instruction address (CIA)-relative load/store using program counter (PC)-relative load and store addressing in an embodiment.
Figure 6:
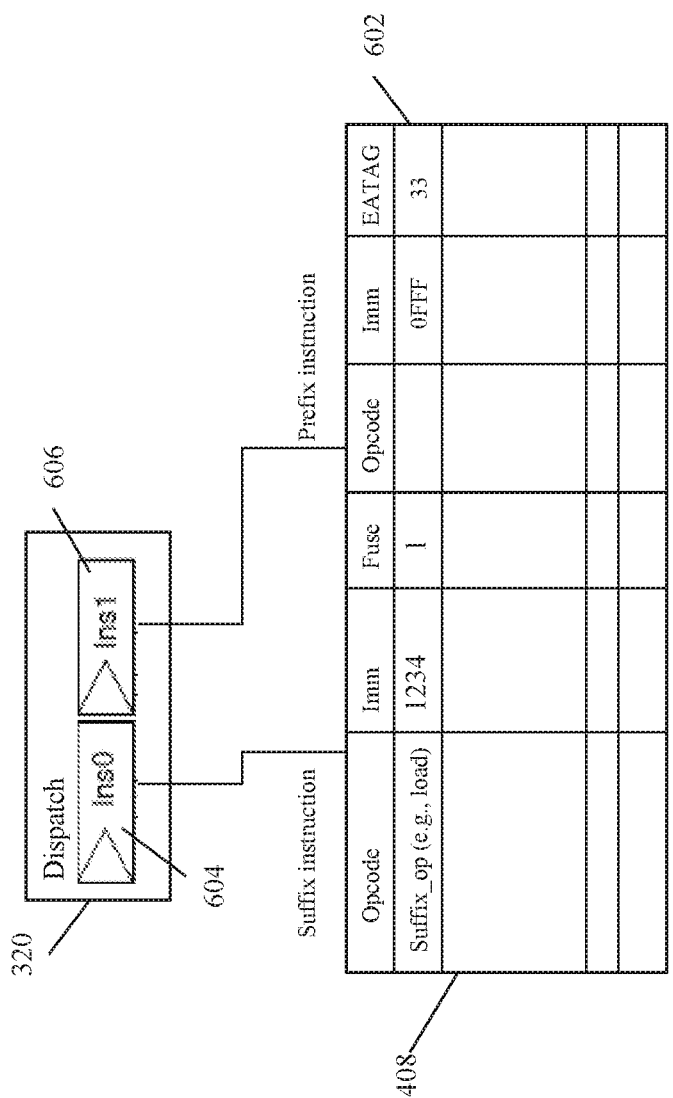
FIG. 6 illustrates a dispatch unit and issue queue of an issue unit in an embodiment.

The processor 110 and processor pipeline shown in FIGS. 4-6 include an Instruction Fetch Unit (IFU) 310, an Instruction Issue Unit (ISU) 315, and Execution Unit (EXU) portion 340, e.g., vector scalar unit (VSU) and load store unit (LSU). FIG. 4 shows a simplified block diagram of an Instruction Fetch Unit (IFU) 310 in a processor 110 according to an embodiment. FIG. 5 illustrates a current instruction address (CIA)-relative load/store using program counter (PC)-relative load and store addressing in an embodiment.

Referring to FIG. 4, an Instruction Fetch Unit (IFU) 310 detects that two consecutive processor instructions are PC-relative prefix instructions (e.g., a prefix instruction and corresponding suffix instruction) and treats the two as one special fused instruction. For example, the Instruction Fetch Unit (IFU) 310 includes an instruction pre-decode 306 for detecting that two consecutive instructions are PC-relative prefix instructions, whether or not the next instruction of an instruction is part of that instruction. If the two consecutive instructions are PC-relative prefix instructions, the IFU 310 treats the two as one special fused instruction.

A prefix instruction provides information for the subsequent or next instruction, for example, modifies the meaning of the next or following instruction (referred to herein as a suffix instruction). An example of information provided for the next instruction may include, but not limited to, information as to which value to use, which operand to use, information as to displacement of immediate fields, information regarding how to control a floating point, managing exceptions, and/or others. An opcode or operation code may specify whether an instruction is a prefix instruction. By way of example, a prefix instruction can include an operation code or opcode field, which specifies a prefix instruction; an instruction address field, which may indicate a base address to be used for the suffix instruction (instruction following the prefix instruction), e.g., overriding one or more operands of the suffix instruction; and one or more immediate fields (e.g., including 16 bit values) to be used with one or more operands of the suffix instruction. A prefix instruction can include other fields or information for modifying the suffix instruction. A suffix instruction such as the load instruction can follow a prefix instruction. The term "two consecutive instructions" and/or "prefix instructions" as used herein can also refer to an instruction having a prefix part and a suffix part. For instance, architecturally, there can be an instruction with two instruction granules, for example, a prefixed instruction with two parts. Such an instruction can also be referred to as a "prefixed instruction."

If the instructions are not prefix instructions, then conventional instruction decode can be performed. If the instructions are PC-relative prefix instructions, then the two instructions treated as a fused instruction are both marked as fusible and are written into the Instruction Cache 307. In one or more embodiments, a bit field can be included to mark the instructions as fusible. The pair of instructions marked as fusible are read from the Instruction Cache 307, decoded further in Decode 308, and placed in Instruction Buffer 309. After the instructions are read from the Instruction Cache 307, the IFU 310 transmits the two instructions to the Instruction Issue Unit (ISU) 406. The IFU 310 also sends the fused instruction CIA to an execution unit such as the VSU 402 to write into a shadow effective address translation (EAT) register file (RF) of the VSU 402. In the following description a VSU is used as an execution unit that stores fused instruction CIA and forms operands for the fused instruction. Another execution unit can be used. For example, as shown in FIG. 5, the IFU 310 sends at 412 the fused instruction CIA to the VSU 402 to write into a shadow effective address table (EAT) register file (RF) 404.

The two instructions transmitted to the Instruction Issue Unit (ISU) 406 are issued on a lane pair 311 (even lane), 312 (odd lane), for example, shown in FIG. 4. In an embodiment, optionally, the IFU 310 may swap the prefix and suffix instructions, so that the prefix instruction occupies the odd lane 312 and the suffix instruction occupies the even lane 311. This swapping has the effect of rendering the prefix instruction as a younger part of two instructions. The IFU 310 sends the fused instruction to a Dispatch Unit of the Issue Unit (ISU) 406 on a full lane (both even and odd lanes) 311, 312, along with the effective address tag (EATAG) of the fused instruction. For example, referring to FIG. 5, the IFU 310 also sends EATAG to the Dispatch Unit.

The Issue Unit (ISU) 406 dispatches instructions to an issue queue (ISQ) 408. The Dispatch Unit of the ISU 406 auto-finishes the prefix instruction part that is occupying the odd lane. Auto-finish finishes the instruction without having to execute the instruction. In an aspect, auto-finish occurs at the dispatch time and the prefix instruction does not execute once it is auto-finished. For instance, the prefix instruction finishes without issue or execution. The prefix instruction is sent to the Finish & Completion Unit 428 and marked as finished.

The Dispatch Unit of the ISU 406 writes the fused instruction into a full ISQ entry (both halves of an ISQ entry) 408, for example, shown at 424. For example, a fused instruction written into the full ISQ entry includes an opcode field and an immediate field of the suffix instruction, immediate field of the prefix instruction, and an EATAG specifying an entry where the VSU stores the CIA of the fused instruction. The full ISQ entry also includes a field indicating whether the instruction is a fused instruction. For instance, if the fuse field is set to 1 or another designated value to indicate that the instructions are fused, both ISQ halves (even and odd) are working together to operate on the prefix and suffix instruction pair. The suffix instruction will write into the ISQ_even, and the prefix information (e.g., immediate field) will write into ISQ_odd. If the fuse field is set to 1 or another designated value, both ISQ slots (even and odd) are issued together. If the fuse field is set to 0 or another designated value to indicate that the instruction is not a fused instruction, both ISQ halves (even and odd) work independently. For example, Add1 and Add2 are two different instructions, and can be issued independently. The ISQ entry can have other fields or information. By way of example, in the example fused entry shown at 424, Imm1="1234" is from the original example suffix instruction; Imm2="0FFF" is from the original example prefix instruction; IOP=instruction opcode, for example, from the suffix instruction, for example, "load".

FIG. 6 also shows and example of a dispatch unit and ISQ entry of an ISU 406 in an embodiment. The Dispatch Unit 320 and ISQ 408 (ISQ is also shown in FIG. 3, for example at 330a, 330b) are components of the ISU 406. For simplicity other components of the ISU 406 are not shown in FIG. 6. The Dispatch Unit 320 writes the fused instruction 604, 606, into a full ISQ entry 602. If the IFU 310 swaps the prefix and suffix instructions, instruction at 604 represents the suffix instruction and the instruction at 606 represents the prefix instruction. The two instructions are written to the ISQ entry 602.

Referring to FIG. 5, the ISQ 408 issues the suffix instruction (e.g., the load instruction) from the even lane and the prefix instruction's immediate field from the odd lane. In aspect, the suffix instruction is issued for execution with all information from both the suffix and prefix instructions. For example, the ISQ 408 issues an instruction opcode or operation code (IOP) 414 specifying the type of operation such as the load-immediate or load-indexed operation, and immediate fields, Imm1, Imm2 shown at 416 and 418. For example, Imm1 416 represents the immediate field of the suffix instruction, and Imm2 represents the immediate field of the prefix instruction. At the same time, the ISQ 406 also issues at 426 the corresponding EATAG of the fused instruction to the VSU 406.

A vector and scalar unit (VSU) 402 uses the EATAG to access the shadow EAT RF 404 for the CIA and sends this CIA to a LSU 410 on operand A of the suffix instruction, for example, as RA=CIA. VSU 402 can form another operand of the suffix instruction, e.g., operand B, for example, using one or more fields of the suffix instruction and the prefix instruction, and/or using information from accessing a register file. VSU 402 forms operand B, for example, as RB=imm1, Imm2 using either the immediate field issued from the ISQ 408, or from a register file 420 such as a general register file access. For example, depending on the type of the load operation, which is specified by the IOP 414, the second operand of the load instruction can be an immediate field or data from a register. For example, load immediate instruction takes operands, RA and RB, in which RA specifies an effective address and RB part is an immediate value. Load indexed instruction has operands RA and RB, in which RA specifies an effective address and RB is a register value. The VSU 402 sends the operands to the LSU 410 via an operand multiplexer or MUX (OMX) 422. For example, CIA occupies bits [0:31], Imm1 occupies bits [32:47] and Imm2 occupies bits [48:63] of 64 bits sent to the LSU 410. The dashed lines ISS (issue), RF1 and RF2/BYP show different cycles, for example, issue cycle, register file cycle and bypass cycle.

LSU is responsible for executing load and store instructions. The LSU 410 has both operands, received from the VSU 402 and the IOP received from the ISQ 408. For example, the LSU has operand A=CIA from CIA register file (EAT RF of the VSU), operand B=immediate field 1 and immediate field 2, or from a register file. The LSU 410 executes and finishes the fused instruction, the suffix part of the instruction using the operands. Finish & Completion Unit 428 (e.g., ICT 325b shown in FIG. 3) completes both halves of the fused instruction at the same time.

In embodiments, PC-relative load and store addressing disclosed herein improves or increases performance of a processor, for example, with respect to instructions and execution time. For instance, the PC-relative load and store addressing increases performance to specially handle prefix instructions for PC-relative load-store addressing. While the above description used the load instruction as an example of a suffix instruction, other suffix instructions can be contemplated. For instance, the method and/or system can also apply to a Store instruction to generate early store address.

Figure 7:
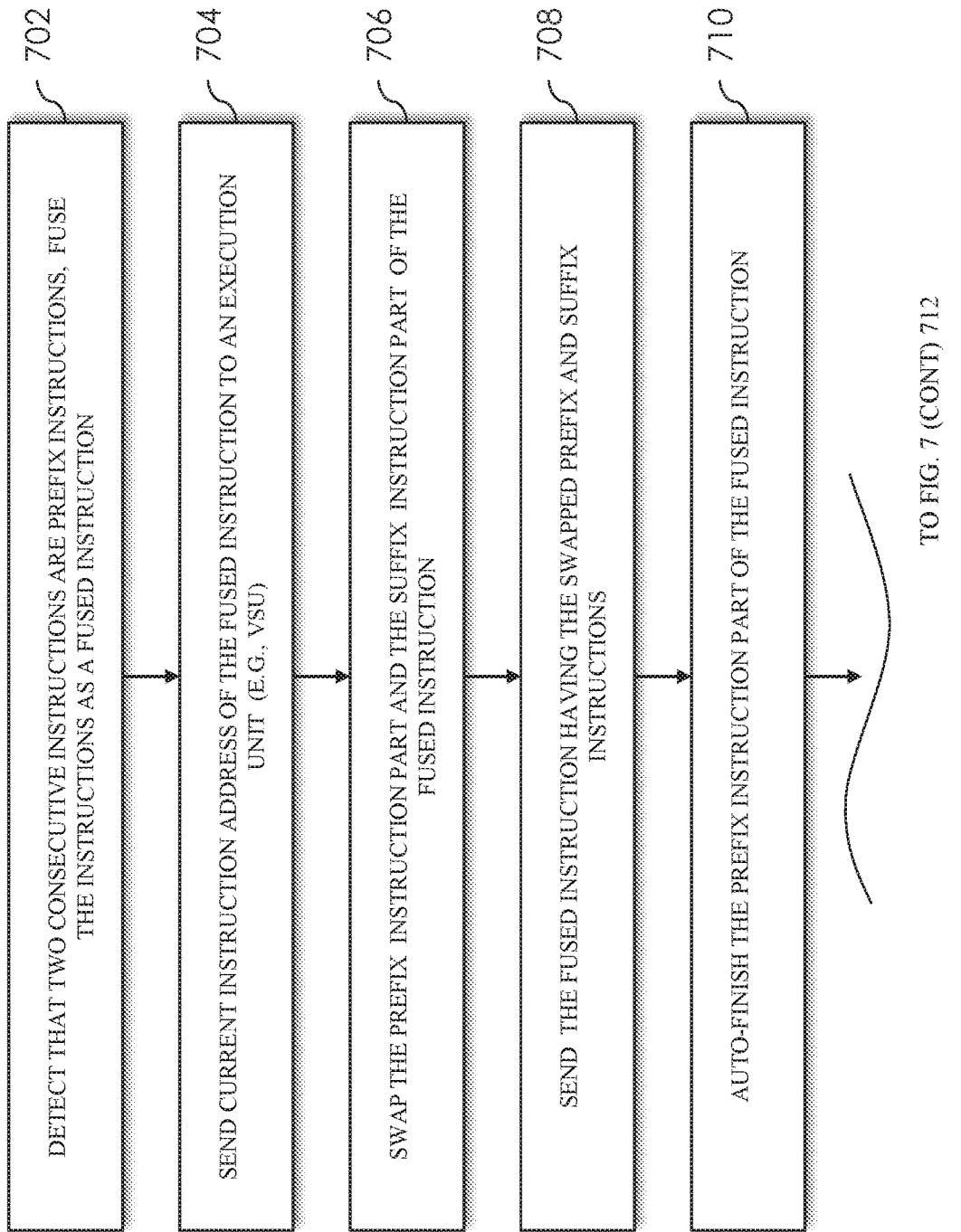
FIG. 7 is a flow diagram illustrating a method in an embodiment for performing a PC-relative load store addressing.
Figure 7:

FIG. 7 is a flow diagram illustrating a method in an embodiment for performing a PC-relative load store addressing. The method can be performed by a processor, for example, including an IFU, ISU, execution units such as a VSU and LSU. At 702, the processor, for example, an instruction fetch unit (IFU), detects or determines whether two consecutive instructions are prefix instructions, e.g., PC-relative prefix instructions, for example, whether an instruction is a prefix to the following instruction, the prefix including information to modify the following instruction. The instruction including the prefix is referred to as a prefix instruction and the following instruction to be modified by the prefix is referred to as a suffix instruction. If the two consecutive instructions prefix instructions (e.g., a prefix instruction followed by a suffix instruction), e.g., PC-relative prefix instructions, they are treated as a single fused instruction, for example, to issue as one instruction from an issue queue to the load store unit. For instance, the two instructions are fused into a single instruction. In an aspect, whether an instruction is a prefix instruction can be detected based on the op code or the operation code of the prefix instruction. An example of a suffix instruction can be the load instruction, and an example of a prefix instruction can be an instruction to displace an operand of the suffix instruction. Other examples are possible. If the two consecutive instructions are determined to be prefix instructions, the method continues to 704. If the two consecutive instructions are not prefix instructions, the method may process the instructions in a conventional manner.

At 704, the processor, for example, the instruction fetch unit (IFU), sends the current instruction address (CIA) of the fused instruction fusing the two instructions to an execution unit, for example, a vector scalar unit (VSU) to write into a register file, for example, a shadow effective address table register file (EAT RF) of the VSU. While the VSU is used as an example of an execution unit that holds an effective address table and performs functions such as forming the operands of the suffix instruction such as the load instruction and sending to the LSU, it is possible to employ another execution unit.

At 706, the processor, for example, the instruction fetch unit (IFU), may swap the prefix instruction and the suffix instruction so that the prefix instruction will occupy the odd lane and the suffix instruction will occupy the even lane, rendering the prefix instruction appear as a younger instruction than the suffix instruction. For instance, the IFU fetched two consecutive instructions would be [prefix instruction] [suffix instruction]. In this optional scenario, after the IFU swaps the instructions, the two consecutive instructions would be [suffix instruction] [prefix instruction].

At 708, the processor, for example, the instruction fetch unit (IFU), sends the fused instruction (which may include the swapped prefix and suffix instructions) to the issue unit (ISU), for example, to the dispatch unit of the ISU, on a full lane, e.g., both even and odd lanes. In an embodiment, the suffix instruction may occupy the even lane and the prefix instruction may occupy the odd lane. The instruction fetch unit (IFU) also sends to the dispatch unit of the ISU, an effective address tag (EATAG) of the fused instruction.

At 710, the processor, for example, the dispatch unit of the ISU auto-finishes the prefix instruction part, which for example, may be occupying the odd lane. At 712, the processor, for example, the dispatch unit of the ISU writes the fused instruction into a full issue queue (ISQ) entry (both halves of an ISQ entry). At 714, the ISQ will issue the suffix instruction (e.g., load instruction) to the LSU, for example, from the even lane (occupied by the suffix instruction) and the immediate field of the prefix instruction, for example, occupying the odd lane. The ISQ will also issue the corresponding EATAG of the fused instruction to the VSU at the same time.

At 716, the processor, for example, the VSU, uses the EATAG to access the shadow EAT RF for the CIA and sends the CIA to the LSU on operand A, for example, the load operation's or the suffix instruction's first operand. For example, the VSU forms operand A based on the CIA. The VSU also forms operand B, for example, the load operation's or the suffix instruction's second operand. In one aspect, for instance, based on the type of the suffix instruction, the VSU may form operand B using the immediate field issued from the ISQ (e.g., the prefix instruction's immediate field and the suffix instruction's immediate field). For example, if the suffix instruction is a load-immediate instruction, the VSU forms operand B using the immediate field issued from the ISQ. In another aspect, if the suffix instruction is a load-indexed instruction, the VSU forms operand B by accessing a register file for a register address that holds the information for the operand B.

At 718, the processor, for example, the load store unit (LSU), executes and finishes the fused instruction, for example, based on the instruction (e.g., IOP) issued from the ISQ and the operands formed by the VSU. At 720, the processor completes both halves of the fused instruction at the same time, for example, in 1 clock cycle.

Figure 8:
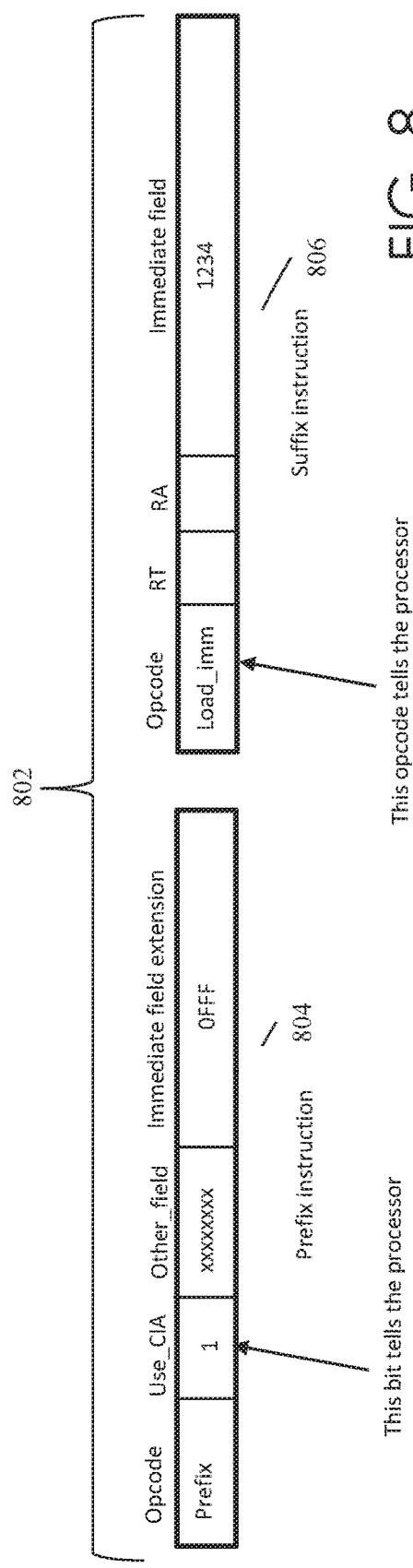
FIG. 8 shows an example of prefix-suffix pair of instructions in an embodiment.

FIG. 8 shows an example of prefix-suffix pair of instructions in an embodiment. The instructions 802 include a prefix instruction part 804 and a suffix instruction part 806. For example, two consecutive instructions 802 can include a prefix instruction (or prefix part) and a load immediate instruction as a suffix instruction. A prefix instruction can include a bit field that tells the processor to use CIA as the RA operand for the suffix instruction. A suffix instruction can have an opcode that tells the processor to use immediate fields as the RB operand.

Figure 9:
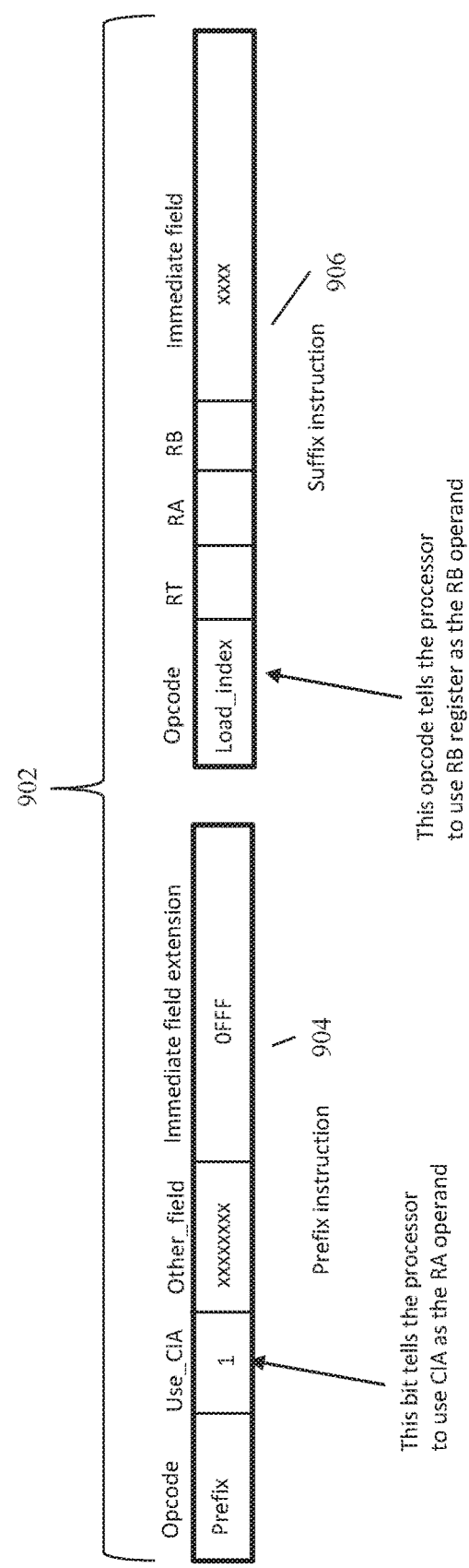
FIG. 9 shows another example of prefix-suffix pair of instructions in an embodiment.

FIG. 9 shows another example of prefix-suffix pair of instructions in an embodiment. The instructions 902 include a prefix instruction part 904 and a suffix instruction part 906. For example, two consecutive instructions 902 can include a prefix instruction (or prefix part) and a load index instruction as a suffix instruction. A prefix instruction can include a bit field that tells the processor to use CIA as the RA operand for the suffix instruction. A suffix instruction can have an opcode that tells the processor to use RB register as the RB operand.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method executable by a processor, comprising:
   detecting that two consecutive instructions fetched using a program counter include a prefix instruction and a suffix instruction;
   fusing the prefix instruction and the suffix instruction as a single fused instruction;
   sending a current instruction address of the single fused instruction to an execution unit of the processor;
   sending the suffix instruction and the prefix instruction to an issue unit of the processor to write into an issue queue as a full entry in the issue queue to be issued together;
   issuing from the full entry of the issue queue the suffix instruction and a field of the prefix instruction, wherein an opcode of the suffix instruction is issued to a load store unit of the processor, and a field of the suffix instruction and the field of the prefix instruction are issued to the execution unit of the processor;
   forming, by the execution unit, operands of the suffix instruction, at least one operand of the operands formed based on the current instruction address;
   sending, by the execution unit, the operands to the load store unit; and
   executing, by the load store unit, the suffix instruction using the operands formed by the execution unit.

2. The method of claim 1, further comprising:
   auto-finishing, by a dispatch unit of the issue unit at dispatch time, the prefix instruction without executing the prefix instruction; and
   writing, by a dispatch unit of the issue unit at the dispatch time, the suffix instruction and the prefix instruction as the full entry of the issue queue.

3. The method of claim 1, wherein the execution unit includes a vector scalar unit.

4. The method of claim 1, wherein the two consecutive instructions include program counter-relative instructions.

5. The method of claim 1, wherein the forming the operands further includes forming another operand of the suffix instruction based on the field of the suffix instruction and the field of the prefix instruction.

6. The method of claim 1, wherein the forming of the operands further includes forming another operand of the suffix instruction based on accessing a register file.

7. The method of claim 1, further including storing the current instruction address of the single fused instruction in a register file of the execution unit.

8. The method of claim 7, further includes accessing the register file to read the current instruction address based on an effective address tag issued by the issue queue.

9. The method of claim 1, wherein the sending the suffix instruction and the prefix instruction to an issue unit includes sending, by an instruction fetch unit of the processor, the suffix instruction and the prefix instruction over multiple lanes wherein the suffix instruction is sent on an even lane and the prefix instruction is sent on an odd lane.

10. A system comprising:
    a processor with circuitry and logic configured to process instructions, the processor comprising:
      an instruction fetch unit configured to fetch instructions based on reading a program counter;
      an issue unit having a dispatch unit and an issue queue, the issue queue configured to hold a plurality of instruction entries and further configured to issue instructions according to the plurality of instruction entries for execution;
      an execution unit; and
      a load store unit configured to execute load and store instructions;
    the processor configured to detect that two consecutive instructions fetched using a program counter, include a prefix instruction and a suffix instruction, and fuse the two consecutive instructions as a single fused instruction;
    the processor further configured to send a current instruction address of the single fused instruction to the execution unit;
    the processor further configured to send the suffix instruction and the prefix instruction to the issue unit of the processor to write into the issue queue as a full entry in the issue queue to be issued together;
    the issue queue configured to issue from the full entry of the issue queue the suffix instruction and a field of the prefix instruction, wherein an opcode of the suffix instruction is issued to the load store unit, and a field of the suffix instruction and the field of the prefix instruction are issued to the execution unit;
    the execution unit configured to form operands of the suffix instruction, at least one operand of the operands formed based on the current instruction address held by the execution unit, the execution unit further configured to send the operands to the load store unit; and
    the load store unit configured to execute the suffix instruction using the operands formed by the execution unit.

11. The system of claim 10, wherein the processor is configured to swap the prefix instruction and the suffix instruction to form a swapped instruction, and the dispatch unit is configured to auto-finish at dispatch time the prefix instruction without executing the prefix instruction, and further configured to write at the dispatch time the swapped-instruction as the full entry of the issue queue.

12. The system of claim 10, wherein the execution unit includes a vector scalar unit.

13. The system of claim 10, wherein the two consecutive instructions include program counter-relative instructions.

14. The system of claim 10, wherein the execution unit is further configured to form another operand of the operands of the suffix instruction based on the field of the suffix instruction and the field of the prefix instruction.

15. The system of claim 10, wherein the execution unit is further configured to form another operand of the operands of the suffix instruction based on accessing a register file.

16. The system of claim 10, wherein the execution unit is further configured to store the current instruction address of the single fused instruction in a register file of the execution unit.

17. The system of claim 16, wherein the execution unit is further configured to read the current instruction address in the register file of the execution unit, based on an effective address tag issued by the issue queue.

18. The system of claim 10, wherein the processor is configured to send the suffix instruction and the prefix instruction to the issue unit over multiple lanes wherein the suffix instruction is sent on an even lane and the prefix instruction is sent on an odd lane.

19. A processor comprising:
 an instruction fetch unit having circuitry and logic, the instruction fetch unit configured to detect that two consecutive instructions fetched using a program counter include a prefix instruction and a suffix instruction, the instruction fetch unit further configured to fuse the two consecutive instructions as a single fused instruction;
 an issue unit having circuitry and logic, the issue unit configured to receive the single fused instruction having the suffix instruction and the prefix instruction and to write the single fused instruction into an issue queue as a full entry in the issue queue, the issue unit further having a dispatch unit configured to auto-finish the prefix instruction of the single fused instruction, the issue queue configured to issue from the full entry of the issue queue the suffix instruction and a field of the prefix instruction;
 a vector scalar unit having circuitry and logic, the vector scalar unit configured to form operands of the suffix instruction, at least one operand of the operands formed based on the current instruction address held by the vector scalar unit;
 a load store unit having circuitry and logic, the load store unit configured to execute the suffix instruction issued by the issue queue using the operands formed by the vector scalar unit.

20. The processor of claim 19, wherein the issue queue is configured to issue an opcode of the suffix instruction to the load store unit and to issue a field of the suffix instruction and the field of the prefix instruction to the vector scalar unit, wherein the vector scalar unit is configured to form another operand of the operands of the suffix instruction based on the field of the suffix instruction and the field of the prefix instruction, and to send the operands to the load store unit.

* * * * *